Aug. 17, 1926.

E. H. LORENZ 1,596,438

GLASS FEEDING APPARATUS

Filed Nov. 18, 1925    2 Sheets-Sheet 1

Inventor
E. H. Lorenz
by Robert A Brown
Attorney.

Patented Aug. 17, 1926.

1,596,438

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

GLASS-FEEDING APPARATUS.

Application filed November 18, 1925. Serial No. 69,756.

My invention relates to apparatus for feeding molten glass from a container to form mold charges, and relates more particularly to feeders of that type in which a cam-operated reciprocating plunger projects into the glass over an outlet in the container, and in which shears operate beneath the outlet, and in timed relation with the movements of the plunger, to sever the discharged glass into mold charges of predetermined size and shape.

In glass feeding apparatus of this type, means should be provided for adjusting the time-relation or phase-relation between the plunger stroke and the shearing operation. Heretofore, the most satisfactory arrangement for permitting such timing or phase-adjustment has been a drive gear differential, the relative positions of the plunger cam and the shear cam being angularly adjustable so as to cause the plunger stroke to occur earlier or later with respect to the shear cut.

The general object of my invention is to provide a simplified and improved phase-changing apparatus which shall fulfill the various requirements of the plunger stroke and shall permit the amplitude and other characteristics of the plunger movements to be adjusted when required.

More specifically, my invention aims to provide an inexpensive and durable device for the above-indicated purposes, including a plunger-operating cam and a shear-operating cam which may be mounted in fixed angular relation to each other and may, therefore, be secured to a common driving shaft in combination with an adjustable connection between one of these cams and the plunger.

In the specific embodiment of my invention herein shown and described, the timing of the plunger stroke is adjusted by shifting the position of the plunger-cam roller around the periphery of the plunger cam. It may therefore be said that the present apparatus differs from the drive-gear differential heretofore employed, in that the angular relation of the cam rollers is shifted, instead of the angular relation of the cams themselves.

Figure 1:
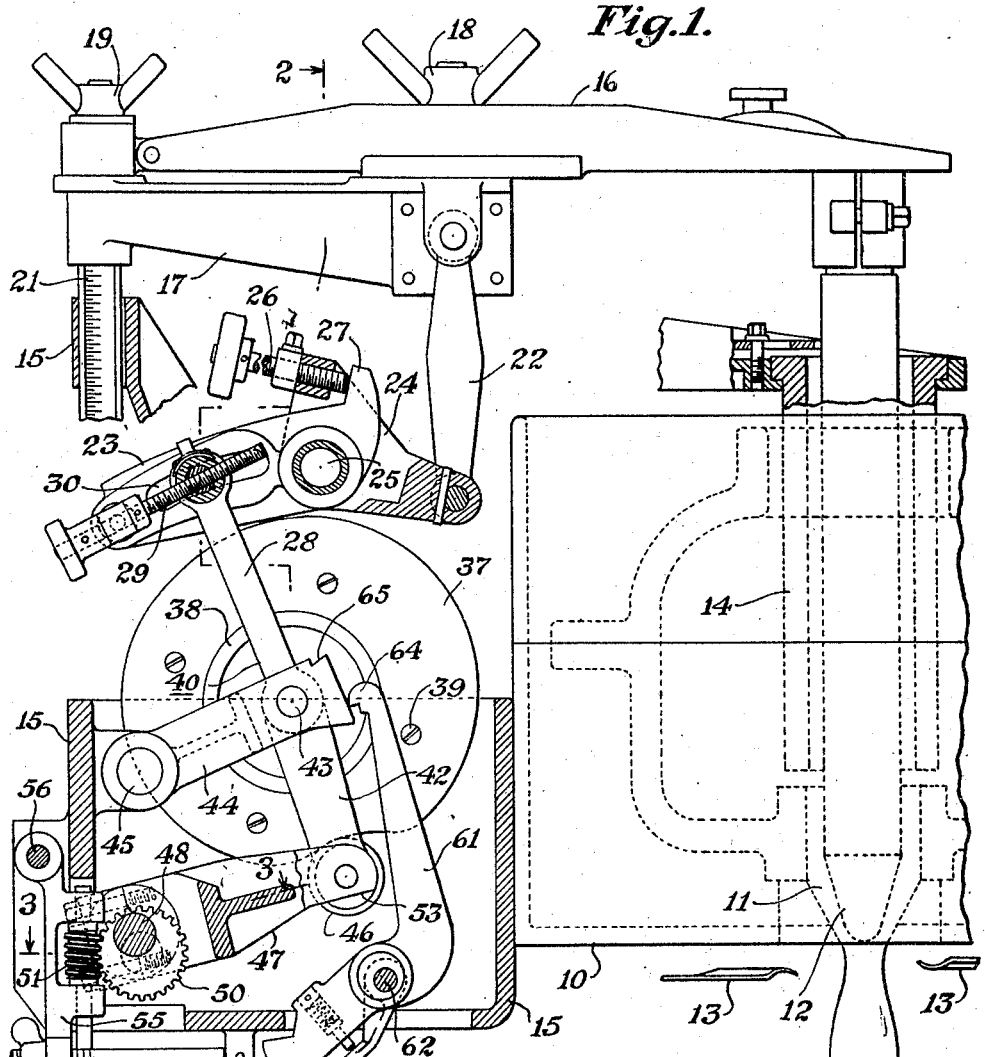
Figure 1 is an elevational view partially in section, showing an assembly of apparatus constructed in accordance with the present invention.

Referring to the drawings, a glass container 10 (Fig. 1) which may be a forehearth connected to a glass melting furnace, has a discharge outlet 11 located in its bottom. The delivery of mold charges through the outlet 11 is controlled by a reciprocating plunger 12 and shears 13 are operated in timed relation with the reciprocations of the plunger, as hereinafter described, to sever the mold charges from the discharged glass. The plunger 12 may be surrounded by a vertically adjustable tube 14 for regulating the quantity of glass supplied to the outlet 11. The plunger-operating mechanism is supported by a frame 15 which may form a part of the forehearth frame.

The plunger 12 is secured to an arm 16 which is mounted on a supporting bracket 17 by means of wing nuts 18 and 19. The plunger 12 is maintained in alignment with the outlet during reciprocation by a guide pin 21 which enters a recess provided in the frame 15.

The plunger mounting is connected by a link 22 with a two-part lever consisting of arms 23 and 24, which arms are held in adjusted relation about the pivot 25 by an adjusting screw 26 carried by the section 24 and engaging a projection 27 on the arm 23. The arm 23 is slotted to connect with an actuating member which, in this case, is a link 28 forming part of the novel plunger-drive mechanism to be described below. An adjusting screw 29 is provided for shifting the upper end of the arm 28 along a slot 30 in the arm 23.

The parts thus far described are similar to corresponding parts shown and described in greater detail in a copending application of Karl E. Peiler, filed December 31, 1923, Serial No. 683,576.

Figure 2:
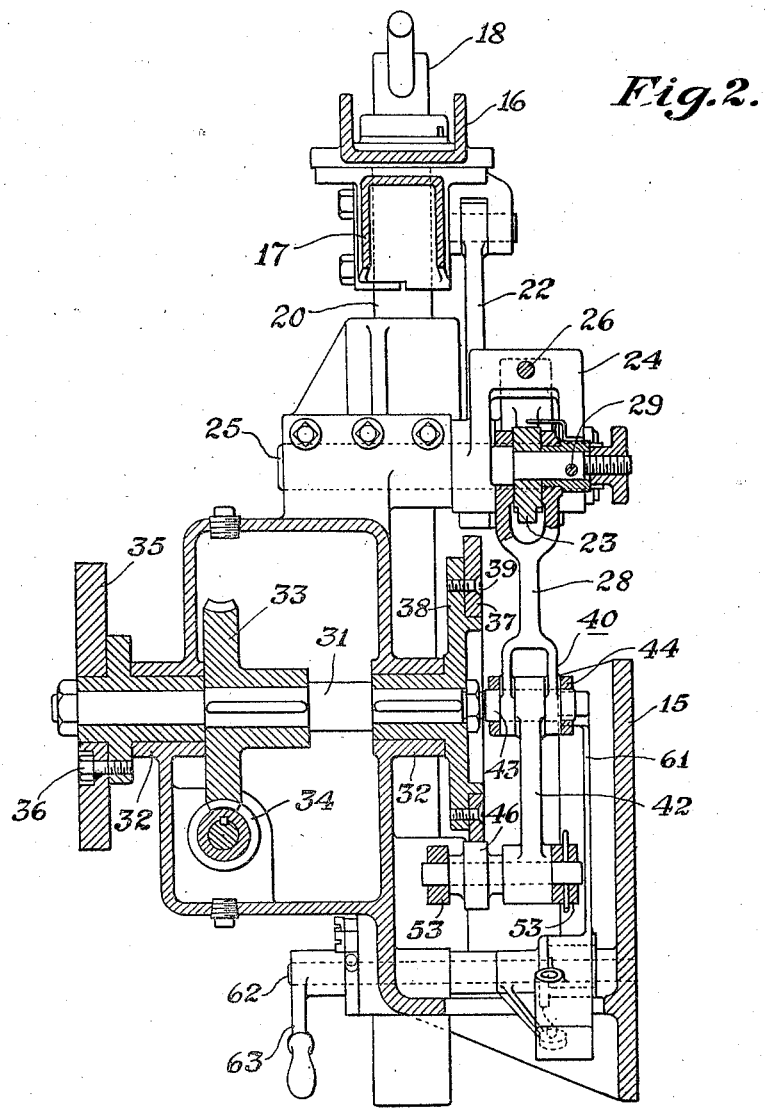
Fig. 2 is a section on the line 2—2 of Fig. 1.

As shown in Fig. 2, the mechanism for reciprocating the plunger 12, and for closing and opening the shears 13, comprises a shaft 31 mounted in bearings 32—32 and rotated by a worm gear 33 driven by a worm 34 from any suitable source of power. The shears are operated by a cam disc 35 which is detachably secured to the shaft 31 by means of bolts 36. The connecting mechanism, not shown, for opening and closing the shears, and for adjusting the shear blades, is similar to that described in the Peiler application above referred to, and forms no part of the present invention.

The mechanism for reciprocating the plunger comprises a cam 37, secured to a disc 38 on the shaft 31 by screws 39. This operating cam is adapted to give the desired reciprocation to the plunger and the screws provide a ready means for changing the cams. Reciprocatory motion is transmitted from the cam 37 to the plunger by means of a compound link member 40 composed of sections or links 28 and 42 hinged together by a pin 43. The upper link 28 is adjustably pivoted to the compound lever 23—24 as described above, while the lower extremity of the link 42 carries a cam roller 46 which serves as a drive connection for the compound link member 40. The pivot pin 43 is guided by a radius arm 44 having one end pivotally mounted on the frame 15 at a fixed point 45 and the other end connected to the pivot pin 43. Thus the roller 46, when actuated by the cam 37, causes the compound link member 40 to reciprocate the plunger through the adjustable connections described above.

In order that the lower limit of the plunger stroke shall not be substantially changed by any adjustment of the cam roll 46, the pivot connection between the links 28 and 42 should be arranged to coincide with the axis of the cam 37 when the plunger is at its lowest position, at which time the pivot pin 43 is at its upper limit of travel.

The pivot 45 of the radius arm 44 should be so located that the length of the plunger stroke shall be substantially the same for all adjustments of the cam roll 46. This is accomplished, in designing the apparatus upon a drawing similar to Fig. 1, by striking intersecting arcs from the extreme limits of adjustment of the axis of the cam roll 46, when the roll is fully depressed by the cam 37, with the length of the link 42 as a radius. The point of intersection of these arcs is the point to which the pivot 43 is required to move at the lower limit of its travel. A line is then drawn between this point and the axis of the cam 37, which, as stated above, is the upper limit of travel of the pivot 43. The pivot 45 may then be located at any convenient point on a line perpendicular to and bisecting the line joining the two limits of travel of the pivot 43. It will thus be seen that the length of the plunger stroke will be exactly the same for both extremes of adjustment of the cam roller 46, and this stroke will not be changed to any substantial extent at any intermediate adjustment. However, if the pivot 45 is located very much to either side of the perpendicular reference line described above, the adjustment of the cam roll 46 circumferentially of the cam 37 will be accompanied by a change in the length of the plunger stroke.

Figure 3:
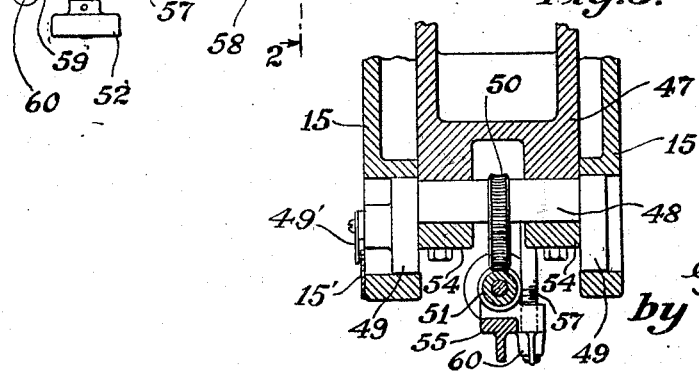
Fig. 3 is a sectional view on the line 3—3, Fig. 1, showing details of the adjustment mechanism.

For the purpose of adjusting the cam roll 46 circumferentially along the surface of the cam 37 and thereby advancing or retarding the time of reciprocation of the plunger stroke with respect to the shear operation, an arm 47 connects with the cam roll 46 and is mounted on the frame 15 by a pivot pin 48 which is mounted eccentrically in its bearings by means of discs 49—49. This pin is rotated on its eccentric axis to advance or retract the cam roll, and this rotation is effected by a worm gear 50 which is mounted on the pin 48 concentric to the axis of rotation thereof. The gear 50 is manually rotated by a worm 51 and a hand wheel 52 mounted on an adjustable frame which serves to lock the gears in any desired adjusted position as hereinafter described. The arm 47 connects with the cam roll by means of forked end portions 53—53 and the other extremity of the link 47 is also provided with forked portions 54—54 which connect with the pivot pin 48, Fig. 3.

To effect the desired operation of the adjusting mechanism, the worm 51 is mounted in a block 55 which is pivotally connected to the main frame 15 at 56. The gears 50 and 51 are maintained in engagement by means of a screw bolt 57 extending from a lug 58 beneath the main frame and through an opening 59 in the lower end of the block 55. A wing nut 60 is applied to the bolt 57 for exerting a clamping action on the gears 50 and 51 to lock them in their adjusted position. The extent of movement of the arm 47 may be indicated by any suitable mechanism as, for example, by a pointer 49' on one of the bearing discs 49 and a scale 15' on the frame.

For the purpose of holding the plunger in inoperative position when desired, with the cam roller 46 out of engagement with the cam 37, I provide a bell crank latch arm 61 mounted eccentrically on a pivot shaft 62 and operated by a hand lever 63 (Fig. 2). The upper end of the latch arm 61 is provided with a hook 64 adapted to engage a recess 65 at the outer end of the radius arm 44. This latch device is similar in its construction and operation to the plunger throw-out latch device described in the copending Peiler application mentioned above, to which reference may be had for a more detailed description. The present latch device differs from that shown in the Peiler application mainly in that the hook arm 61 has been made longer so as to cooperate with the end of the radius member 44 which swings in substantially the same path for all adjustments, instead of cooperating with the cam roll supporting arm 47, which in this case swings about an adjustable axis.

In adjusting the plunger stroke by means of the mechanism described above, the lower limit of the plunger stroke is fixed by adjustment of the screw 26 and the upper limit of the plunger stroke is adjusted by turning the screw 29. These adjustments are similar to those provided in the mechanism of the Peiler application referred to above. When it is desired to change the time at which the plunger stroke takes place with respect to the shear cut, the wing nut 60 is loosened and the hand wheel 52 is turned to rotate the eccentrically mounted pin 48 and cause the radius arm 47 to move the cam roller 46 circumferentially of the cam 37 and thereby change the time at which the plunger reciprocates. When the desired time of operation is effected, the gears of the roll-adjusting mechanism are locked in the adjusted position by the clamping action of the wing nut 60. By this means the parts are not only fixed in their adjusted position, but are prevented from backlash and from movement in any direction, which would tend to disturb the proper action of the plunger cam.

The mechanism described above provides a simple and durable means for accurately and quickly changing the phase-relation between a glass feeding plunger and the shears which sever the delivered mold charges. The details of construction herein shown and described have been found to give good results in actual service, but it will be understood that various changes in the construction and arrangement of the parts may be made without departing from the invention as defined in the appended claims.

I claim as my invention:

1. Apparatus for feeding molten glass, comprising a container for the molten glass having a discharge outlet, a reciprocating implement for regulating the discharge of glass through the outlet, a cam and a cam roll for reciprocating the implement, and means for adjusting the cam roll circumferentially with respect to said cam, whereby the time of operation of the implement may be changed.

2. Apparatus for feeding molten glass, comprising a container for the molten glass having a discharge outlet, a reciprocating implement for regulating the discharge of glass through the outlet, a cam and a cam roll for reciprocating the implement, means for adjusting the cam roll circumferentially with respect to said cam, whereby the time of operation of the implement may be changed, and means for indicating the extent of adjustment of said cam roll.

3. Apparatus for feeding molten glass having a cam-operated vertically reciprocating plunger, a roller for transmitting motion from the cam to the plunger, and means for adjusting said roller angularly with respect to an axis coinciding with the axis of the cam when the plunger is in its lowest position.

4. Apparatus for operating the plunger and the shears of a plunger glass-feeder and for adjusting the relative time of operation of such plunger and shears, comprising a plunger-operating cam and a shear-operating cam mounted in fixed angular relation to each other, a cam roller for transmitting movement from one of said cams to the plunger or shear mechanism operated thereby, and means for adjusting said cam roller circumferentially with respect to its cam and for thereby varying the relative timing of the strokes of said plunger and said shears.

5. Apparatus for operating the plunger and the shears of a plunger glass-feeder and for adjusting the relative time of operation of such plunger and shears, comprising a shaft, a plunger-operating cam and a shear-operating cam both secured to said shaft, a cam roller for transmitting movement from said plunger-operating cam to said plunger, and means for adjusting said cam roller circumferentially with respect to said plunger-operating cam and for thereby varying the timing of the strokes of said plunger with respect to the movements of the shears.

6. Apparatus for operating the plunger and the shears of a plunger glass-feeder and for adjusting the relative time of operation of such plunger and shears, comprising a shaft, a plunger-operating cam and a shear-operating cam both secured to said shaft, a cam roller for transmitting movement from said plunger-operating cam to said plunger, means for adjusting said cam roller circumferentially with respect to said plunger-operating cam and for thereby varying the timing of the strokes of said plunger with respect to the movements of the shears, and means for indicating the extent of adjustment of said cam roll.

7. Apparatus for operating the plunger and the shears of a plunger glass-feeder and for adjusting the relative time of operation of such plunger and shears, comprising a plunger-operating cam and a shear-operating cam, both mounted for rotation in fixed angular relation to each other, a cam roller for transmitting movement from said plunger-operating cam to said plunger, and eccentric means for adjusting said cam roller circumferentially with respect to said plunger-operating cam and for thereby varying the timing of the strokes of said plunger with respect to the movements of the shears.

8. Apparatus for operating the plunger and the shears of a plunger glass-feeder and for adjusting the relative time of operation of such plunger and shears, comprising a plunger-operating cam and a shear-operating cam, both mounted for rotation in fixed angular relation to each other, a cam roller for transmitting movement from said plunger-operating cam to said plunger, eccentric means for adjusting said cam roller circumferentially with respect to said plunger-operating cam and for thereby varying the timing of the strokes of said plunger with respect to the movements of the shears, and means associated with the eccentric for indicating the extent of adjustment of said cam roller.

9. Apparatus for operating the plunger and the shears of a plunger glass-feeder, and for adjusting the relative time of operation of such plunger and shears, comprising a rotatable shaft, a plunger-operating cam and a shear-operating cam both secured to said shaft, a cam roller for transmitting movement from said plunger-operating cam to said plunger, an arm secured at one end to the pivot of said cam roller and having its other end supported upon an eccentric mounting, means for turning the said eccentric mounting and for thereby varying the position of said cam roller circumferentially with respect to said cam, and means for clamping the said turning means in adjusted position.

10. Apparatus for operating the plunger and the shears of a plunger glass-feeder, and for adjusting the relative time of operation of such plunger and shears, comprising a rotatable shaft, a plunger-operating cam and a shear-operating cam both secured to said shaft, a cam roller for transmitting movement from said plunger-operating cam to said plunger, an arm secured at one end to the pivot of said cam roller and having its other end supported upon an eccentric mounting, means for turning the said eccentric mounting and for thereby varying the position of said cam roller circumferentially with respect to said cam, means associated with the eccentric for indicating the extent of movement of said cam roller, and means for clamping the said turning means in adjusted position.

11. Apparatus for operating the plunger and the shears of a plunger glass-feeder and for adjusting the relative time of operation of such plunger and shears, comprising a rotatable shaft, a plunger-operating cam and a shear-operating cam both secured to said shaft, a cam roller for transmitting movement from said plunger-operating cam to said plunger, an arm secured at one end to the pivot of said cam roller and having its other end supported upon an eccentric mounting, said mounting comprising a shaft, a disc supporting said arm and eccentrically mounted upon said shaft, a worm wheel mounted on said shaft coaxially with respect to said disc, a worm for turning said worm wheel, a movable support for said worm, and means acting upon said support for clamping said worm and said worm wheel in adjusted positions.

12. In apparatus for separating molten glass into mold charges, the combination of a container for the glass having a discharge outlet, a glass feeding implement projecting into the glass in said container for controlling the discharge of glass from the outlet, means beneath the outlet for severing mold charges from the discharged glass, a rotary cam, a cam roller engaging said cam, and a compound member for transmitting movement from said cam roller to said implement, the said compound member being composed of sections pivoted together, and the pivotal connection between said sections being coaxial with the axis of rotation of said cam when said implement is in its position nearest to said outlet.

13. In apparatus for separating molten glass into mold charges, the combination of a container for the glass having a discharge outlet, a glass feeding implement projecting into the glass in said container for controlling the discharge of glass from the outlet, means beneath the outlet for severing mold charges from the discharge glass, mechanism for operating the implement and the severing means including a compound member, means for changing the angular relation of the components of said member, including an eccentric mechanism connected to one extremity of said member, and means for operating the eccentric.

14. In apparatus for separating molten glass into mold charges, the combination of a container for the glass having a discharge outlet, a glass feeding implement projecting into the glass in said container for controlling the discharge of glass from the outlet, means beneath the outlet for severing mold charges from the discharged glass, mechanism for operating the implement and the severing means including a compound member, means for changing the angular relation of the components of said member, including an eccentric mechanism operatively connected to one extremity of said member, means for rotating the eccentric, and means for clamping the rotative parts in fixed relation.

15. In apparatus for separating molten glass into mold charges, the combination of a container for the glass having a discharge outlet, a glass feeding implement projecting into the glass in said container for controlling the discharge of glass from the outlet, means beneath the outlet for severing mold charges from the discharged glass, mechanism for operating the implement and the severing means including a compound member, means for changing the angular relation of the components of said member, including an arm connected to one extremity of said compound member, a shaft, a gear mounted on said shaft and adapted to move said arm, a cooperating gear for rotating said first-named gear, and means associated with said gears for clamping the gears in fixed relation.

16. In apparatus for separating molten glass into mold charges, the combination of a container for the glass having a discharge outlet, a vertically reciprocating plunger projecting into the glass over the outlet, shears operating beneath the outlet to sever mold charges from the glass discharged therefrom, and means for operating the plunger and the shears, including a compound member having its components pivotally connected together, means for adjusting one end of said compound member to thereby advance or retard the operation of the plunger relative to the operation of the shears, and means for clamping the adjusting means in fixed relation.

17. In apparatus for feeding molten glass in mold charges, the combination of a vertically reciprocable feed-controlling plunger, a lever for transmitting reciprocatory movement to said plunger, a plunger-operating cam mounted for rotation on a horizontal shaft, a cam roller engaging said cam, and a compound member connecting said cam roller and said lever, said compound member having its components pivotally connected at a point that is substantially coincident with the cam axis when the plunger is in its lowest position.

18. In apparatus for feeding molten glass in mold charges, the combination of a vertically reciprocable feed-controlling plunger, a lever for transmitting reciprocatory movement to said plunger, a plunger-operating cam mounted for rotation on a horizontal shaft, a cam roller engaging said cam, and a compound member connecting said cam roller and said lever, said compound member having its components pivotally connected at a point that is substantially coincident with the cam axis when the plunger is in its lowest position, and means for shifting said cam roller circumferentially with respect to said cam and for thereby changing the timing of the strokes of said plunger.

19. Apparatus for feeding molten glass having a cam-operated reciprocating plunger, a cam roller for transmitting motion from the cam to the plunger, means for adjusting said roller angularly with respect to a movable axis coincident with the axis of the cam when the plunger is at one extreme position of its stroke, and means for guiding said movable axis so that the said roller may be adjusted angularly with respect to said movable axis, without substantially changing the length of the stroke of said plunger.

20. Apparatus for feeding molten glass having a cam-operated reciprocating plunger, a cam roller for transmitting motion from the cam to the plunger, means for adjusting said roller angularly with respect to a movable axis coincident with the axis of the cam when the plunger is at its lowest stroke position, and means for guiding said movable axis so that the said roller may be adjusted angularly with respect to said movable axis without substantially changing the length of stroke of said plunger.

21. In apparatus for feeding molten glass in mold charges, the combination of a vertically reciprocable feed-controlling plunger, a lever for transmitting reciprocatory movement to said plunger, a shaft, a plunger-operating cam mounted for rotation on said shaft, a cam roller engaging said cam, a compound member connecting said cam roller and said lever, said compound member having its components pivotally connected at a point that is substantially coincident with the cam axis when the plunger is in its lowest position, means for adjusting said cam roller circumferentially with respect to said cam and for thereby changing the timing of the strokes of said plunger, and means for guiding said connection point to move from alignment with said cam axis in such a way that the length of the stroke of said plunger shall be substantially uniform throughout the range of adjustment of said roller.

Signed at Hartford, Conn., this 17th day of November, 1925.

EDWARD H. LORENZ.